United States Patent [19]

Komiya et al.

[11] Patent Number: 4,990,468
[45] Date of Patent: Feb. 5, 1991

[54] FLUOROPHOSPHATE OPTICAL GLASS

[75] Inventors: Masayuki Komiya; Masaaki Otsuka; Naruhito Sawanobori, all of Yono; Shinobu Nagahama, Kasukabe, all of Japan

[73] Assignee: Sumita Optical Glass, Inc., Tokyo, Japan

[21] Appl. No.: 414,385

[22] Filed: Sep. 29, 1989

[30] Foreign Application Priority Data

Oct. 6, 1988 [JP] Japan .................................. 63-252350

[51] Int. Cl.$^5$ .......................... C03C 3/247; C03C 4/00
[52] U.S. Cl. ...................................... 501/44; 501/902; 501/903
[58] Field of Search ........................... 501/44, 902, 903

[56] References Cited

U.S. PATENT DOCUMENTS 4,358,543 11/1982 Nozawa .................................. 501/44

FOREIGN PATENT DOCUMENTS 649512 1/1951 United Kingdom ................... 501/44
1136658 12/1968 United Kingdom ................... 501/44

Primary Examiner—Mark L. Bell
Attorney, Agent, or Firm—Wenderoth, Lind & Ponack

[57] ABSTRACT

A fluorophosphate optical glass having optical constants, i.e. refractive index (nd) of 1.54 to 1.60 and Abbe number (νd) of 68 to 75 and having abnormal partial dispersion represented by a relative partial dispersion of at least 0.537 is provided, which has a chemical composition (% by weight) comprising:

| | |
|---|---|
| $Al(PO_3)_3$ | 15–32% |
| $Ba(PO_3)_2$ | 0–10% |
| $Sr(PO_3)_2$ | 0–10% |
| $Ca(PO_3)_2$ | 0–10% |
| $Mg(PO_3)_2$ | 0–10% |
| sum of metaphosphates | 20–32% |
| $BaF_2$ | 20–70% |
| $SrF_2$ | 5–40% |
| $CaF_2$ | 0–15% |
| $MgF_2$ | 0–10% |
| $AlF_3$ | 0–5% |
| $GdF_3$ | 0–5% |
| sum of fluorides | 55–75% |
| $Gd_2O_3$ | 5–22% |
| $La_2O_3$ | 0–7% |
| $Y_2O_3$ | 0–10% |
| $Yb_2O_3$ | 0–10% |
| sum of rare earth oxides | 5–22% |

6 Claims, No Drawings

FLUOROPHOSPHATE OPTICAL GLASS

BACKGROUND OF THE INVENTION

1. Field of the Invention

This invention relates to a fluorophosphate optical glass having optical constants, i.e. refractive index (nd) of 1.54 to 1.60 and Abbe number (νd) of 68 to 75 and having abnormal partial dispersion represented by a relative partial dispersion of at least 0.537.

2. Description of the Prior Art

An optical glass having abnormal partial dispersion, capable of effecting correction of the secondary spectrum in dispersing a lens, is very important for designing the same and is of high utility value.

As to fluorophosphate glasses having abnormal partial dispersion and a refractive index (nd) of at most 1.50, a number of reports have been made and it is known that the fluorophosphate glass disclosed in Japanese Patent Laid-Open Publication No. 144141/1988 has been produced on a commercial scale and used for various optical instruments.

On the other hand, optical designers have eagerly had requirements for an optical glass having a higher refractive index, lower dispersion and abnormal partial dispersion. The optical glasses having optical constants satisfying such requirements are known as disclosed in Japanese Patent Publication Nos. 28169/1978, 4145/1985 and 14500/1987.

The known optical glasses contain large amounts of $Ba(PO_3)_2$ and BaO as essential components as in a glass composition, for example, comprising 2.0 to 13.0% of $MgF_2$, 0 to 20.0% of $SrF_2$, 1.0 to 33.0% of $BaF_2$, 0 to 8.0% of $AlF_3$, 0 to 8.0% of $YF_3$, 13.0 to 39.0% of $Al(PO_3)_3$, 0 to 24.0% of $Mg(PO_3)_2$, 1.0 to 20.0% of $Ca(PO_3)_2$, 5.0 to 19.0% of $Ba(PO_3)_2$, 10.0 to 36.0% of BaO, 1.5 to 12.0% of $Y_2O_3$ and/or $Yb_2O_3$, 0 to 6.0% of ZnO, 0 to 29.0% of PbO and 0 to 22.0% of $Nb_2O_5$, % being by weight, described in Japanese Patent Publication No. 4145/1985. However, the large contents of $Ba(PO_3)_2$ and BaO result in not only increase of the dispersion but also lowering of the abnormal partial dispersion. These known optical glasses having a relatively high liquidus temperature are so unstable that crystals tend to be precipitated and comparable properties to those of the optical glass according to the present invention cannot be realized in a stable manner.

SUMMARY OF THE INVENTION

It is an object of the present invention to provide a fluorophosphate optical glass having a refractive index (nd) of 1.54 to 1.60, an Abbe number (νd) of 68 to 75 and a relative partial dispersion of at least 0.537.

It is another object of the present invention to provide a stable fluorophosphate optical glass having an excellent chemical durability, which can be produced on a commercial scale.

These objects can be attained by a chemical composition (% by weight) comprising 15 to 32% of $Al(PO_3)_3$, 0 to 10% of $Ba(PO_3)_2$, 0 to 10% of $Sr(PO_3)_2$, 0 to 10% of $Ca(PO_3)_2$ and 0 to 10% of $Mg(PO_3)_2$, the sum of the metaphosphates being 20 to 32%, 20 to 70% of $BaF_2$, 5 to 40% of $SrF_2$, 0 to 15% of $CaF_2$, 0 to 10% of $MgF_2$, 0 to 5% of $AlF_3$ and 0 to 5% of $GdF_3$, the sum of the fluorides being 55 to 75%, and 5 to 22% of $Gd_2O_3$, 0 to 7% of $La_3O_3$, 0 to 10% of $Y_2O_3$ and 0 to 10% of $Yb_2O_3$, the sum of the rare earth element oxides being 5 to 22%.

DETAILED DESCRIPTION OF THE INVENTION

The inventors have made various efforts to overcome the disadvantages of the prior art fluorophosphate optical glasses, as described above, and consequently, have found that an optical glass having a glass composition comprising $Al(PO_3)_3$, $BaF_2$, $SrF_2$ and $Gd_2O_3$ as essential components has optical constants sought by the inventors. The present invention is based on this finding.

Accordingly, the present invention provides a novel fluorophosphate optical glass having a refractive index of 1.54 to 1.60, an Abbe number of 68 to 75 and a relative partial dispersion of at least 0.537, which has a chemical composition (% by weight) comprising:

| | |
|---|---|
| $Al(PO_3)_3$ | 15–32%, preferably 20–27% |
| $Ba(PO_3)_2$ | 0–10% |
| $Sr(PO_3)_2$ | 0–10% |
| $Ca(PO_3)_2$ | 0–10% |
| $Mg(PO_3)_2$ | 0–10% |
| sum of metaphosphates | 20–32% |
| $BaF_2$ | 20–70%, preferably 30–45% |
| $SrF_2$ | 5–40%, preferably 15–30% |
| $CaF_2$ | 0–15% |
| $MgF_2$ | 0–10% |
| $AlF_3$ | 0–5% |
| $GdF_3$ | 0–5% |
| sum of fluorides | 55–75% |
| $Gd_2O_3$ | 5–22%, preferably 10–20% |
| $La_2O_3$ | 0–7% |
| $Y_2O_3$ | 0–10% |
| $Yb_2O_3$ | 0–10% |
| sum of rare earth oxides | 5–22%. |

The grounds for limiting the proportion ranges of the components to the foregoing are as follows:

$Al(PO_3)_3$ is a main component essential for forming the network structure of glass, contributing to stability and increasing the chemical durability, and is used in a proportion of 15 to 32%, since if less than 15%, not only the chemical durability is deteriorated but also the glass becomes unstable, while if more than 32%, crystallization tendency is too large to obtain the glass.

$Ba(PO_3)_2$, $Sr(PO_3)_2$, $Ca(PO_3)_2$ and $Mg(PO_3)_2$ are optional components for raising the refractive index, increasing the chemical durability and improving the workability and are respectively used in a proportion of 0 to 10%, since if more than 10%, the abnormal partial dispersion is lowered. This should be avoided. If the sum of the amounts of these metaphosphates is less than 20% or more than 32%, the glass tends to be too crystallized to maintain it.

$BaF_2$ is an essential component for lowering the dispersion and raising the abnormal partial dispersion and is used in a proportion of 20 to 70%, since if less than 20%, the glass tends to be crystallized, while if more than 70%, the chemical durability is deteriorated and the glass is too unstable to maintain it.

$SrF_2$ is an essential component functioning similarly to $BaF_2$ and serving to stabilize the glass jointly with $BaF_2$, and is used in a proportion of 5 to 40%, since if less than 5%, the stabilizing effect of glass is decreased, while if more than 40%, the chemical durability is deteriorated and the crystallization tendency is too increased to maintain it.

$CaF_2$ is an optional component, although having the similar effect to $BaF_2$ and $SrF_2$, and is used in a proportion of 0 to 15%, since if more than 15%, the glass tends to be crystallized and becomes unstable.

$MgF_2$ is an optional component, although having the similar effect to $BaF_2$ and $SrF_2$, and is used in a proportion of 0 to 10%, since if more than 10%, the glass tends to be crystallized and becomes unstable.

$AlF_3$ is an optional component having an effect of lowering the dispersion and is used in a proportion of 0 to 5%, since if more than 5%, the glass tends to be too crystallized to maintain it.

$GdF_3$ is an optional component having an effect of raising the refractive index without raising the dispersion, and an effect of increasing the hardness of the glass, and is used in proportion of 0 to 5%, since if more than 5%, the glass tends to be too crystallized to maintain it.

If the sum of the amounts of these fluorides is less than 55%, the glass becomes unstable, while if more than 75%, not only the chemical durability is deteriorated but also the glass becomes unstable.

$Gd_2O_3$ is an essential component capable of raising the refractive index without raising the dispersion as well as imparting a high refractive index and abnormal partial dispersion without substantial introduction of barium oxide component, and further capable of raising the hardness of the glass and serving to improve the mechanical strength and workability. It is used in a proportion of 5 to 22%, since if less than 5%, the intended refractive index cannot be obtained and the mechanical strength and workability are deteriorated, while if more than 22%, dissolving of it is difficult and the insoluble material is precipitated, resulting in the crystallization tendency.

$La_2O_3$, $Y_2O_3$ and $Yb_2O_3$ are optional components, although having the similar effect to $Gd_2O_3$, and are respectively used in a proportion of 0 to 7%, 0 to 10% and 0 to 10%, since if the amounts of $La_2O_3$, $Y_2O_3$ and $Yb_2O_3$ are respectively more than 7%, 10% and 10%, the glass tends to be too crystallized to maintain it.

If the sum of the amounts of these rare earth oxides is less than 5%, the intended refractive index cannot be obtained, while if more than 22%, dissolving of them is difficult and insoluble ones are precipitated, so that the glass tends to be too crystallized to maintain it.

Production of the fluorophosphate optical glass of the present invention can generally be carried out by mixing raw materials in a predetermined proportion to give the above described composition, melting the mixture at a temperature of 1000° C. to 1250° C., and then subjecting the melt to casting in a conventional manner.

The fluorophosphate optical glass of the present invention has optical constants, i.e. a refractive index (nd) of 1.54 to 1.60, an Abbe number (νd) of 68 to 75 and abnormal partial dispersion represented by a relative partial dispersion of at least 0.537, is excellent in chemical durability as well as stability and can readily be produced on a commercial scale, as described above.

The following examples are given in order to illustrate the present invention in greater detail without limiting the same.

EXAMPLE 1 TO EXAMPLE 20

Examples of the glass composition of the present invention are shown in Table 1 and the refractive indexes (nd), Abbe numbers (νd) and relative partial dispersion values (ng-nF/nF-nC) are shown in Table 2.

The fluorophosphate optical glass of the present invention was prepared by weighing the corresponding metaphosphates, oxides and fluorides, as raw materials, in predetermined proportions, mixing adequately these materials to prepare a starting material for the glass preparation, charging the starting material in a platinum crucible, melting in an electric furnace at a temperature of 1000° to 1250° C., stirring by a platinum stirrer to render the material clear and homogeneous, casting in a suitably preheated metal mold and then cooling gradually.

In Example 1, for example, the raw materials corresponding to the composition of Example 1 were weighed and mixed adequately according the above described procedure and then melted in an electric furnace previously heated at 1100° C. for 3 hours, thus obtaining a fluorophosphate optical glass with a refractive index (nd) of 1.58222, an Abbe number (νd) of 69.2 and a relative partial dispersion (ng-nF/nF-nC) of 0.545.

In these examples, the metaphosphates were used, but the present invention should not be construed to be limited thereto and of course, other raw materials capable of in situ formation of the metaphosphates can be used, for example, oxides and phosphoric acid in combination, or pyrophosphates to give the specified quantity according to the present invention. The above described fluorides can partly be replaced by several percents of LiF, NaF and/or KF as far as the object of the present invention is not lost.

The relative partial dispersion (ng-nF/nF-nC) in Table 2 means the degree of abnormal partial dispersion that a glass has positioned apart from the straight line connecting two points of relative partial dispersion when taking the relative partial dispersion on the ordinate and the Abbe number (νd) on the abscissa choosing normal glasses 511605-K7 and 620363-F2 as a standard. Since in the scope of the present invention as claimed, the standard relative partial dispersion of the normal glasses are 0.532 and 0.521 respectively at an Abbe number (νd) of 68 and 75, a glass has abnormal partial dispersion if the relative partial dispersion of this glass is apart from the straight line connecting two points of the standard relative partial dispersion.

As apparent from the results of Examples, for example, the glass of Example 1 has abnormal partial dispersion in view of its large relative partial dispersion (ng-nF/nF-nC), i.e. 0.545.

In comparison with the prior art optical glasses having an Abbe number (νd) of 66 to 70 shown in Table 3, the glasses of Examples 1 to 20 according to the present invention show higher refractive indexes (nd) and larger relative partial dispersion (ng-nF/nF-nC).

TABLE 1

|  | 1 | 2 | 3 | 4 | 5 | 6 | 7 | 8 | 9 | 10 |
|---|---|---|---|---|---|---|---|---|---|---|
| $Al(PO_3)_3$ | 25.0 | 20.0 | 25.0 | 30.0 | 30.0 | 20.0 | 20.0 | 17.0 | 25.0 | 25.0 |
| $Ba(PO_3)_2$ |  |  |  |  |  |  |  | 10.0 |  |  |
| $Sr(PO_3)_2$ |  |  |  |  |  |  |  |  |  |  |
| $Ca(PO_3)_2$ |  |  |  |  |  |  |  |  |  |  |
| $Mg(PO_3)_2$ |  |  |  |  |  |  |  |  |  |  |
| $BaF_2$ | 25.0 | 70.0 | 30.0 | 30.0 | 45.0 | 40.0 | 35.0 | 22.0 | 35.0 | 37.0 |

TABLE 1-continued

|  | | | | | | | | | | |
|---|---|---|---|---|---|---|---|---|---|---|
| SrF$_2$ | 30.0 | 5.0 | 30.0 | 30.0 | 20.0 | 20.0 | 20.0 | 13.0 | 25.0 | 23.0 |
| CaF$_2$ | | | | | | | | 15.0 | | |
| MgF$_2$ | | | | | | | | 8.0 | | |
| AlF$_3$ | | | | | | | 5.0 | | | |
| GdF$_3$ | | | | | 5.0 | | | | | |
| Gd$_2$O$_3$ | 20.0 | 5.0 | 15.0 | 10.0 | 5.0 | 15.0 | 20.0 | 15.0 | 5.0 | 10.0 |
| La$_2$O$_3$ | | | | | | | | | | 5.0 |
| Y$_2$O$_3$ | | | | | | | | | | |
| Yb$_2$O$_3$ | | | | | | | | | 10.0 | |

|  | 11 | 12 | 13 | 14 | 15 | 16 | 17 | 18 | 19 | 20 |
|---|---|---|---|---|---|---|---|---|---|---|
| Al(PO$_3$)$_3$ | 25.0 | 17.6 | 25.0 | 25.0 | 20.0 | 30.0 | 17.0 | 30.0 | 18.6 | 24.0 |
| Ba(PO$_3$)$_2$ | | | | | | | | | | |
| Sr(PO$_3$)$_2$ | | 8.0 | | | | | | | | |
| Ca(PO$_3$)$_2$ | | | | | | | | | 8.0 | |
| Mg(PO$_3$)$_2$ | | | | | | | 10.0 | | | |
| BaF$_2$ | 33.0 | 25.6 | 25.0 | 37.0 | 60.0 | 60.0 | 22.0 | 35.0 | 25.8 | 41.0 |
| SrF$_2$ | 27.0 | 14.4 | 40.0 | 23.0 | 5.0 | 5.0 | 13.0 | 20.0 | 14.4 | 20.0 |
| CaF$_2$ | | 12.0 | | | | | 15.0 | | 12.0 | |
| MgF$_2$ | | 6.4 | | | | | 8.0 | | 6.4 | |
| AlF$_3$ | | | | | | | | | | |
| GdF$_3$ | | 1.0 | | | | | | | | |
| Gd$_2$O$_3$ | 5.0 | 15.0 | 10.0 | 8.0 | 15.0 | 5.0 | 15.0 | 15.0 | 15.0 | 8.0 |
| La$_2$O$_3$ | | | | 2.0 | | | | | | 2.0 |
| Y$_2$O$_3$ | 10.0 | | | | | | | | | 2.0 |
| Yb$_2$O$_3$ | | | | 5.0 | | | | | | 3.0 |

TABLE 2

|  | 1 | 2 | 3 | 4 | 5 | 6 | 7 | 8 | 9 | 10 |
|---|---|---|---|---|---|---|---|---|---|---|
| nd | 1.58222 | 1.55697 | 1.56959 | 1.57030 | 1.56637 | 1.56879 | 1.58242 | 1.54874 | 1.57211 | 1.57484 |
| νd | 69.2 | 71.4 | 70.0 | 74.8 | 73.3 | 71.5 | 70.0 | 71.6 | 70.1 | 70.2 |
| ng-nF/nF-nC | 0.545 | 0.544 | 0.544 | 0.543 | 0.543 | 0.550 | 0.539 | 0.545 | 0.545 | |

|  | 11 | 12 | 13 | 14 | 15 | 16 | 17 | 18 | 19 | 20 |
|---|---|---|---|---|---|---|---|---|---|---|
| nd | 1.57474 | 1.55275 | 1.55302 | 1.57393 | 1.57944 | 1.57467 | 1.54122 | 1.58590 | 1.54708 | 1.57274 |
| νd | 70.7 | 71.6 | 69.0 | 68.2 | 69.1 | 69.0 | 74.9 | 69.3 | 74.1 | 71.5 |
| ng-nF/nF-nC | 0.545 | 0.538 | 0.540 | 0.543 | 0.546 | 0.544 | 0.542 | 0.542 | 0.542 | 0.545 |

TABLE 3

| Glass type | 517696 | 487702 | 504668 | 716474 | 465659 |
|---|---|---|---|---|---|
| nd | 1.51728 | 1.48749 | 1.50378 | 1.47069 | 1.46450 |
| νd | 69.6 | 70.2 | 66.8 | 67.4 | 65.9 |
| ng-nF/nF-nC | 0.532 | 0.530 | 0.531 | 0.534 | 0.533 |

What is claimed is:

1. A fluorophosphate optical glass having a refractive index (nd) of 1.54 to 1.60, an Abbe number (νd) of 68 to 75 and a relative partial dispersion of at least 0.537, which has a chemical composition (% by weight) comprising:

| Al(PO$_3$)$_3$ | 15–32% |
|---|---|
| Ba(PO$_3$)$_2$ | 0–10% |
| Sr(PO$_3$)$_2$ | 0–10% |
| Ca(PO$_3$)$_2$ | 0–10% |
| Mg(PO$_3$)$_2$ | 0–10% |
| sum of metaphosphates | 20–32% |
| BaF$_2$ | 20–70% |
| SrF$_2$ | 5–40% |
| CaF$_2$ | 0–15% |
| MgF$_2$ | 0–10% |
| AlF$_3$ | 0–5% |
| GdF$_3$ | 0–5% |
| sum of fluorides | 55–75% |
| Gd$_2$O$_3$ | 5–22% |
| La$_2$O$_3$ | 0–7% |
| Y$_2$O$_3$ | 0–10% |
| Yb$_2$O$_3$ | 0–10% |
| sum of rare earth oxides | 5–22% |

2. The glass according to claim 1, containing 15–27 weight % of Al(PO$_3$)$_3$.

3. The glass according to claim 1, containing 20–27 weight % of Al(PO$_3$)$_3$.

4. The glass according to claim 1, containing 30–70 weight % of BaF$_2$.

5. The glass according to claim 1, containing 30–45 weight % of BaF$_2$.

6. The glass according to claim 2, containing 30–70 weight % of BaF$_2$.

* * * * *